(12) United States Patent
Ono et al.

(10) Patent No.: US 10,258,872 B2
(45) Date of Patent: Apr. 16, 2019

(54) OPERATING APPARATUS, GAME MACHINE, AND CONTROL METHOD

(71) Applicant: OMRON Corporation, Kyoto-shi, Kyoto (JP)

(72) Inventors: Takahiro Ono, Ichinomiya (JP); Hiroyuki Onitsuka, Kani (JP); Masataka Kimura, Ichinomiya (JP); Masaaki Sumi, Gifu (JP); Takehiro Agata, Ichinomiya (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/677,493

(22) Filed: Aug. 15, 2017

(65) Prior Publication Data
US 2018/0071620 A1    Mar. 15, 2018

(30) Foreign Application Priority Data
Sep. 15, 2016 (JP) .................. 2016-181023

(51) Int. Cl.
| | |
|---|---|
| *A63F 9/24* | (2006.01) |
| *A63F 13/00* | (2014.01) |
| *G07F 17/00* | (2006.01) |
| *G07F 19/00* | (2006.01) |
| *A63F 13/2145* | (2014.01) |
| *A63F 13/25* | (2014.01) |
| *G07F 17/32* | (2006.01) |
| *G07F 17/34* | (2006.01) |
| *G06F 3/02* | (2006.01) |
| *G06F 3/041* | (2006.01) |
| *G06F 3/0488* | (2013.01) |

(52) U.S. Cl.
CPC .......... *A63F 13/2145* (2014.09); *A63F 13/25* (2014.09); *G06F 3/0202* (2013.01); *G06F 3/041* (2013.01); *G07F 17/3209* (2013.01); *G07F 17/3288* (2013.01); *G07F 17/34* (2013.01); *G06F 3/0488* (2013.01); *G06F 2203/04103* (2013.01)

(58) Field of Classification Search
CPC ........ A63F 2009/2408; A63F 2009/241; A63F 13/214; A63F 13/2145; A63F 13/42; A63F 2300/1075
See application file for complete search history.

(56) References Cited

U.S. PATENT DOCUMENTS

| | | | | |
|---|---|---|---|---|
| 2002/0191029 A1* | 12/2002 | Gillespie | ............... | G06F 3/0481 715/810 |
| 2009/0058824 A1* | 3/2009 | Nissar | .................. | G06F 3/0412 345/173 |

FOREIGN PATENT DOCUMENTS

JP    H01-23517 Y2    7/1989

* cited by examiner

*Primary Examiner* — Kevin Y Kim
(74) *Attorney, Agent, or Firm* — Metrolexis Law Group, PLLC

(57) ABSTRACT

An operating apparatus includes a touch panel, an LED board, and a display panel. The LED board is arranged below the touch panel. A plurality of LEDs is mounted on the LED board. The display panel is arranged below the LED board. The display panel is configured to change an image displayed in the display panel.

12 Claims, 9 Drawing Sheets

OPERATING APPARATUS, GAME MACHINE, AND CONTROL METHOD

CROSS-REFERENCES TO RELATED APPLICATIONS

This application claims priority to Japanese Patent Application No. 2016-181023, filed Sep. 15, 2016, the entire contents of which are incorporated herein by reference.

FIELD

The disclosure relates to an operating apparatus, a game machine, and a control method.

BACKGROUND

Various types of game machines operated at gaming facilities such as casinos have been known for some time. A game machine includes an operating apparatus used when a player plays a game. The player can use the operating apparatus to make various operations pertaining to the game. Such operations include an operation for setting a betting rate, an operation for selecting various types of information such as valid symbols, an operation for settling the game, an operation for calling a staff member, and so on.

JP H01-23517Y discloses a slot machine as an example of a past game machine. In this slot machine, a stop switch manipulated by a player when stopping a rotating reel is constituted of a touch-type switch including a light-emitting body. The light-emitting body is controlled to light by a signal from a microcomputer, and indicates that a pulse motor for driving the reel is decelerating and can therefore be stopped.

JP H01-23517Y, published Jul. 19, 1989, is an example of background art.

By lighting the light-emitting body, the slot machine according to JP H01-23517Y can communicate to the player that the stop switch is in a state where the reel can be stopped. However, there is a problem in that the game has little appeal for players. Thus what is needed in such past game machines is a dramatic effect capable of better capturing a player's attention.

One or more embodiments of the present invention have been conceived to solve the above-described problems. Accordingly, one or more embodiments of the present invention provide an operating apparatus, a game machine, and a control method capable of strongly capturing a player's attention.

SUMMARY

To solve the above-described problems, an operating apparatus according to an aspect of the present invention is an operating apparatus included in a game machine, the apparatus including: a touch panel; a light-emitting element board arranged below the touch panel, a plurality of light-emitting elements being mounted on the light-emitting element board; and a display unit arranged below the light-emitting element board, the display unit configured to change an image displayed in the display unit.

According to this aspect, the game machine can more strongly catch the player's attention by illuminating the periphery of a display item corresponding to a pressing operation made by the player on the touch panel, on the basis of that pressing operation.

In an operating apparatus according to an aspect of the present invention, it may be preferable that the plurality of light-emitting elements be a plurality of light-emitting diodes.

According to this aspect, the operating apparatus can be made to consume less power.

To solve the above-described problems, a game machine according to an aspect of the present invention includes: any one of the above-described operating apparatuses; a display controller configured to cause an image including a plurality of display items to be displayed in the display unit; an input detector configured to detect a pressing operation at an input position in the touch panel corresponding to any one of the plurality of display items; and a light emission controller configured to cause a light-emitting element, of the plurality of light-emitting elements, corresponding to the one of the display items to emit light.

According to this aspect, the game machine can more strongly catch the player's attention by illuminating the periphery of a display item corresponding to a pressing operation made by the player on the touch panel, on the basis of that pressing operation.

To solve the above-described problems, a control method according to an aspect of the present invention is a method of controlling a game machine including any one of the above-described operating apparatuses, the method including: causing an image including a plurality of display items to be displayed in the display unit; detecting a pressing operation at an input position in the touch panel corresponding to any one of the plurality of display items; and causing a light-emitting element, of the plurality of light-emitting elements, corresponding to the one of the display items to emit light.

According to this aspect, the game machine can more strongly catch the player's attention by illuminating the periphery of a display item corresponding to a pressing operation made by the player on the touch panel, on the basis of that pressing operation.

According to an aspect of the present invention, a player's attention can be caught more strongly.

DETAILED DESCRIPTION

First Embodiment

A first embodiment of the present invention will be described with reference to FIGS. 1 to 4.

Configuration of Game Machine 1

Figure 1:
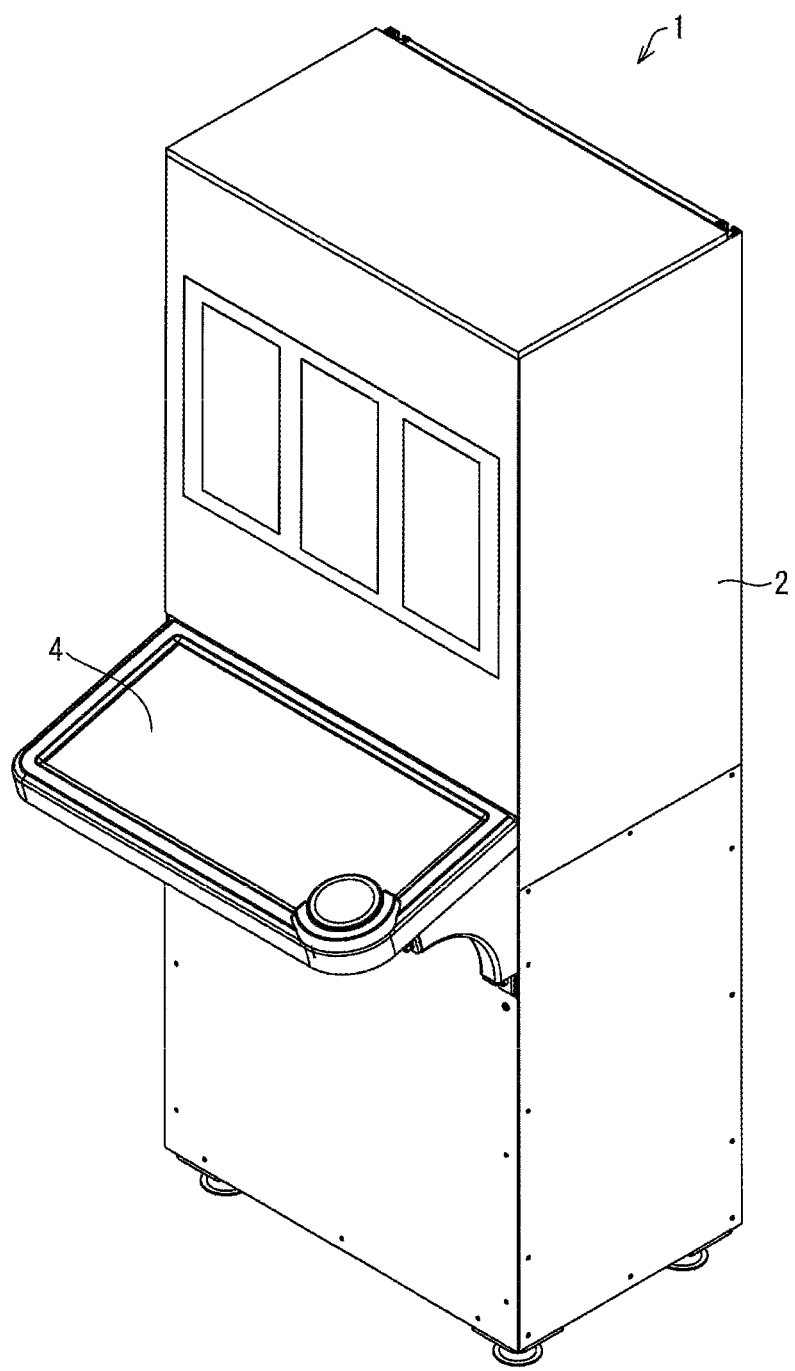
FIG. 1 is a diagram illustrating the external appearance of a game machine according to a first embodiment of the present invention.

FIG. 1 is a diagram illustrating the external appearance of a game machine 1 according to the first embodiment of the present invention. As illustrated in FIG. 1, the game machine 1 includes a housing 2 and an operating apparatus 4. Various components for running the game machine 1 are installed within the housing 2. The housing 2 may be formed from a transparent material. The operating apparatus 4 is an apparatus used when a player plays a game.

The game machine 1 is a slot machine, for example. The player can use the operating apparatus 4 to make various operations pertaining to slot games that can be played in the game machine 1. Such operations include an operation for setting a betting rate, an operation for selecting various types of information such as valid symbols, an operation for settling the game, an operation for calling a staff member, and so on.

The operating apparatus 4 is attached to a position of the housing 2 where it is easy for the player to operate the operating apparatus 4. In the example of FIG. 1, the operating apparatus 4 is attached to a substantially central position on a front surface of the housing 2. A mechanism for slot games (not illustrated) is provided in a position of the housing 2 above where the operating apparatus 4 is attached.

The operating apparatus 4 has an overall substantially plate shape. The operating apparatus 4 is attached to the game machine 1 such that the operating apparatus 4 is substantially parallel to the ground or is tilted at a slight angle relative to the ground.

The operating apparatus 4 includes an operating surface for accepting operations from the player, presenting information to the player, and so on. The operating apparatus 4 is attached to the game machine 1 such that the operating surface faces the player.

Details of Operating Apparatus 4

Figure 2A:
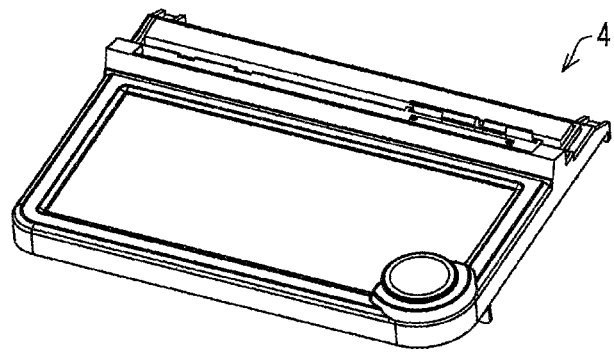
FIGS. 2A to 2C are diagrams illustrating an operating apparatus in detail.
Figure 2B:
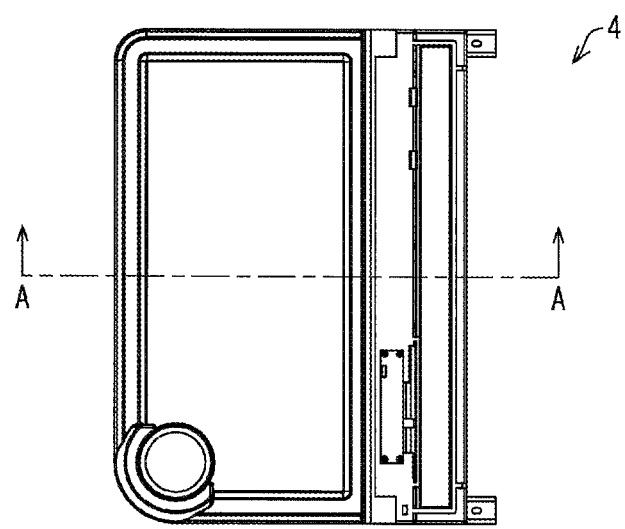
Figure 2C:
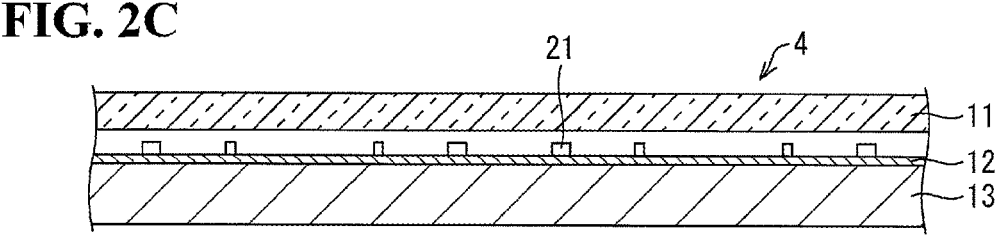

FIGS. 2A to 2C are diagrams illustrating the operating apparatus 4 in detail. FIG. 2A illustrates the operating apparatus 4 from an angle. FIG. 2B illustrates the operating apparatus 4 from above. FIG. 2C illustrates the operating apparatus 4 from an A-A cross-section indicated in FIG. 2B.

As illustrated in FIG. 2C, the operating apparatus 4 includes a touch panel 11, an LED board 12 (a light-emitting element board), and a display panel 13 (a display unit). The touch panel 11, the LED board 12, and the display panel 13 are arranged in a stacked manner. The LED board 12 is disposed below the touch panel 11, and the display panel 13 is disposed below the LED board 12.

The touch panel 11 is a panel that accepts operation inputs from the player. The touch panel 11 as a whole is transparent. A surface of the touch panel 11 corresponds to the operating surface of the operating apparatus 4.

The LED board 12 is an overall transparent board. A plurality of LEDs 21 (light-emitting elements) are mounted on a surface of the LED board 12. The plurality of LEDs 21 are a plurality of light-emitting diodes arranged on the touch panel 11 in a predetermined pattern. The LED board 12 includes the plurality of LEDs 21, and thus the amount of energy consumed by the operating apparatus 4 can be reduced. The plurality of LEDs 21 are thin and small. As such, the plurality of LEDs 21 are not noticeable to the player when the player views the operating surface of the operating apparatus 4.

The display panel 13 is a panel capable of displaying an image. The display panel 13 can change the image displayed therein. In other words, the display panel 13 can switch among different images to be displayed as appropriate. This makes it possible to vary effects presented to the player using displayed images. The display panel 13 is a liquid-crystal display panel, for example. The display panel 13 can be transparent as a whole when not displaying an image. In this case, the display panel 13 includes a transparent backlight, for example. When a transparent form is used for the display panel 13, the player can see his/her own feet through the operating surface of the operating apparatus.

Because the touch panel 11 is transparent, the player can clearly see the light emitted from the LEDs 21. Meanwhile, because the touch panel 11 and the LED board 12 are transparent, the player can clearly see the image displayed in the display panel 13.

Figure 3:
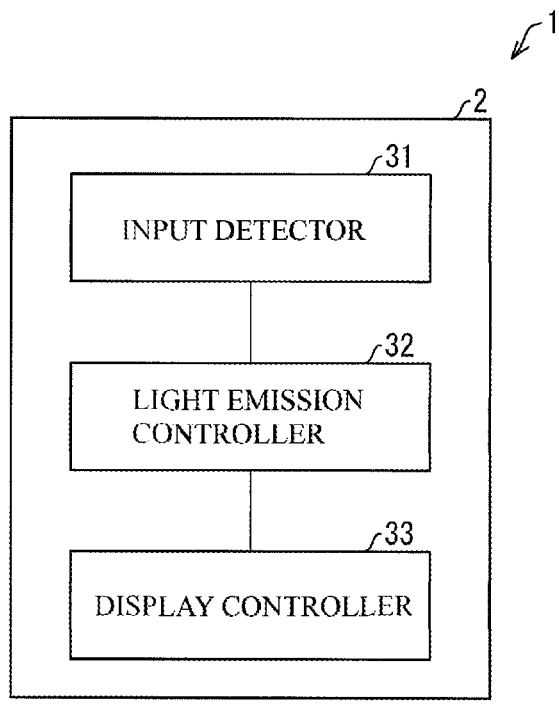
FIG. 3 is a diagram illustrating a functional configuration of the game machine.

FIG. 3 is a diagram illustrating a functional configuration of the game machine 1. As illustrated in FIG. 3, the operating apparatus 4 includes an input detector 31, a light emission controller 32, and a display controller 33. The input detector 31 detects a pressing operation made by the player on the touch panel 11. The light emission controller 32 controls the emission of light by the plurality of LEDs 21 on the basis of a result of the input detector 31 detecting the pressing operation. The display controller 33 causes an image to be displayed in the display panel 13. The display controller 33 is a liquid-crystal driver, for example.

Control of LEDs 21

Figure 4:
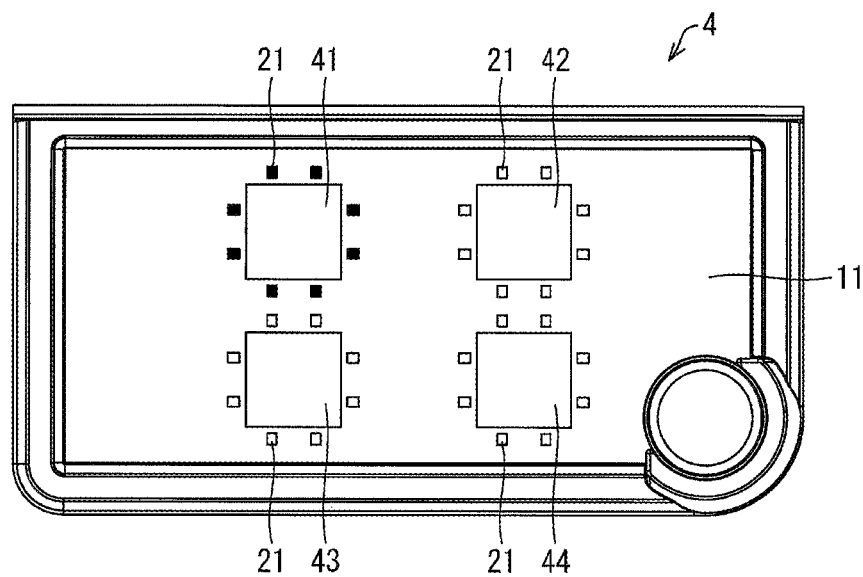
FIG. 4 is a diagram illustrating control of a plurality of LEDs in the operating apparatus.

FIG. 4 is a diagram illustrating control of the plurality of LEDs 21 in the operating apparatus 4. In the example illustrated in FIG. 4, the display controller 33 causes an image including a plurality of buttons 41 to 44 (display items) to be displayed in the display panel 13. Eight of the LEDs 21 are mounted in each of positions, in the LED board 12, corresponding to the periphery of a corresponding one of the buttons 41 to 44.

The player makes a pressing operation on an input position of the touch panel 11 corresponding to the display position of the button 41. The input detector 31 detects this touch operation. The light emission controller 32 identifies the eight LEDs 21, out of all of the LEDs 21 mounted on LED board 12, that correspond to the button 41. The light emission controller 32 then controls the eight identified LEDs 21. Specifically, the light emission controller 32 causes all of the eight LEDs 21 arranged in the periphery of the button 41 to emit light. Meanwhile, the light emission controller 32 controls all of the eight LEDs 21 arranged in the periphery of each of the buttons 42 to 44 to not emit light.

When the player makes the pressing operation for pressing the button 41 on the touch panel 11, the eight LEDs 21 arranged in the periphery of the button 41 emit light. The player can clearly understand that s/he has pressed the button 41 out of the plurality of buttons 41 to 44 on the basis of the light emitted in the periphery of the button 41.

As described thus far, the game machine 1 can more strongly catch the player's attention by illuminating the periphery of the button 41 corresponding to a pressing operation made by the player on the touch panel 11, on the basis of that pressing operation.

Second Embodiment

A second embodiment of the present invention will be described next with reference to FIGS. 5 to 7. Elements that are the same as in the first embodiment will be given the same reference numerals, and detailed descriptions thereof will be omitted.

Like the game machine 1 according to the first embodiment, the game machine 1 according to the second embodiment includes the housing 2 and the operating apparatus 4. The external appearance of the game machine 1 is the same as that illustrated in FIG. 1, and thus detailed descriptions thereof will be omitted as well.

Figure 5A:
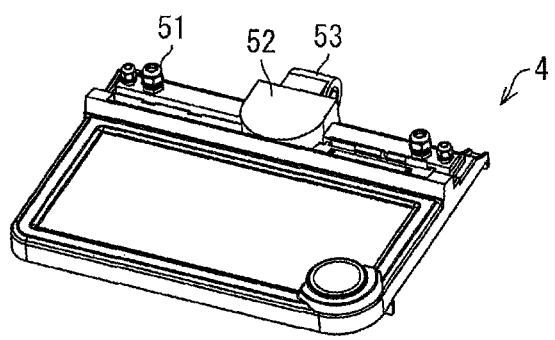
FIGS. 5A to 5D are diagrams illustrating an operating apparatus according to a second embodiment of the present invention in detail.
Figure 5B:
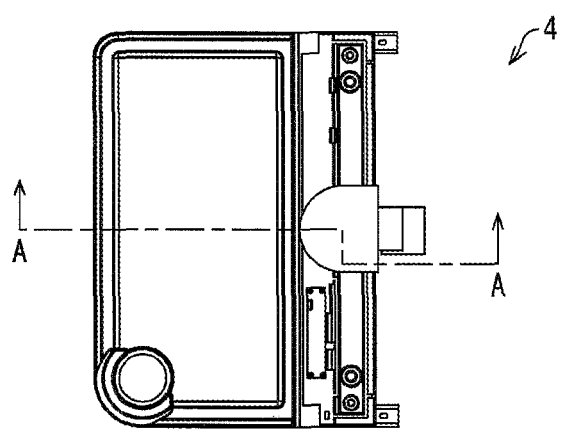
Figure 5C:
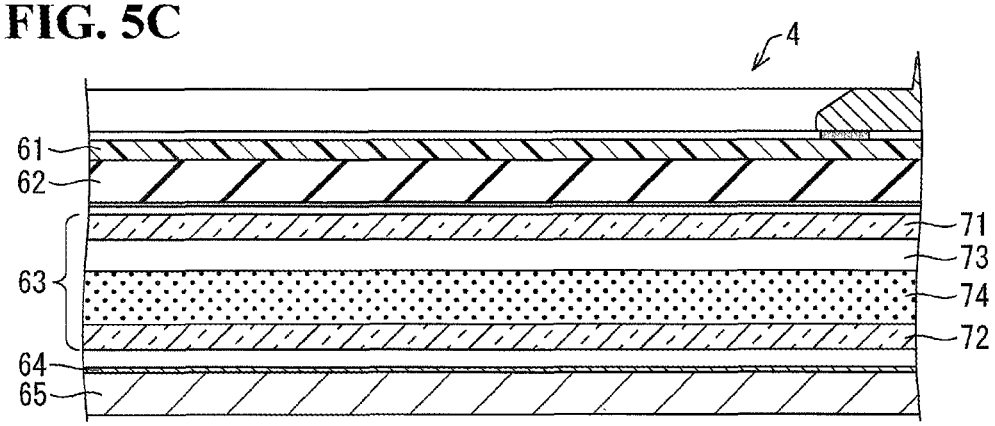
Figure 5D:
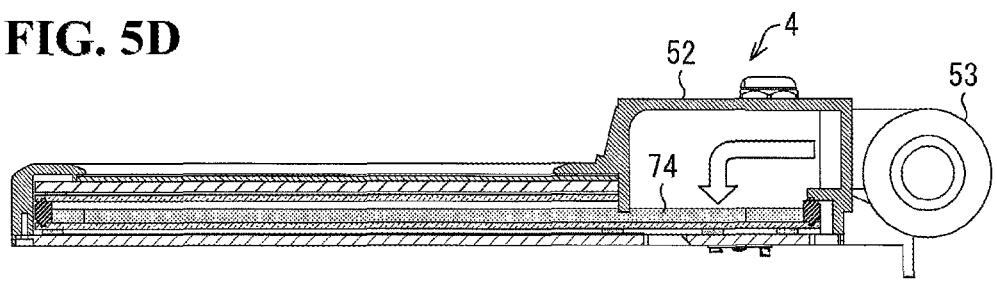

Details of Operating Apparatus 4 FIGS. 5A to 5D are diagrams illustrating the operating apparatus 4 according to the second embodiment of the present invention in detail. FIG. 5A illustrates the operating apparatus 4 from an angle. FIG. 5B illustrates the operating apparatus 4 from above. FIG. 5C illustrates part of the operating apparatus 4 from an A-A cross-section indicated in FIG. 5B. FIG. 5D illustrates all of the operating apparatus 4 from the A-A cross-section indicated in FIG. 5B.

As illustrated in FIG. 5A, the operating apparatus 4 includes an entry/exit port 51, a cover 52, and a fan 53 (a ripple generator). The entry/exit port 51 is a mechanism for introducing a fluid into the operating apparatus 4, extracting the fluid from the operating apparatus 4, and so on. The fluid will be described in detail later. The fan 53 is a blower that blows air against the fluid held within the operating apparatus 4.

As illustrated in FIG. 5C, the operating apparatus 4 includes a touch panel 61, a glass plate 62, a fluid holder 63, a display panel 64 (a display unit), and an acrylic plate 65. The touch panel 61, the glass plate 62, the fluid holder 63, the display panel 64, and the acrylic plate 65 are stacked in that order from the top. The glass plate 62 is arranged below the touch panel 61, the fluid holder 63 is arranged below the glass plate 62, the display panel 64 is arranged below the fluid holder 63, and the acrylic plate 65 is arranged below the display panel 64.

The touch panel 61 is the same as the touch panel 11 according to the first embodiment, and thus detailed descriptions thereof will be omitted.

The glass plate 62 is a transparent reinforcing plate made of glass. By interposing the glass plate 62 between the touch panel 61 and the fluid holder 63, the operating apparatus 4 can be made durable with respect to impacts from the exterior.

The fluid holder 63 is a plate-shaped member inside of which a transparent fluid is held. The fluid holder 63 is constituted of a first transparent plate 71 and a second transparent plate 72 arranged opposing each other. The first transparent plate 71 and the second transparent plate 72 are transparent plates made of glass, for example. The first transparent plate 71 and the second transparent plate 72 are arranged at a constant distance from each other, and thus a space having a constant volume is formed within the fluid holder 63.

The fluid holder 63 holds air 73 and a fluid 74 within the space formed therein. The air 73 and the fluid 74 have a layered structure. The fluid 74 is a transparent matter that is capable of flowing, and can be a liquid, a vapor, a mist, or the like, for example. In the present embodiment, the fluid 74 is water.

The display panel 64 is the same as the display panel 13 according to the first embodiment, and thus detailed descriptions thereof will be omitted.

The acrylic plate 65 is a transparent acrylic reinforcing plate. By arranging the acrylic plate 65 below the display panel 64, the operating apparatus 4 can be made durable with respect to impacts from the exterior.

The second transparent plate 72 extends to a bottom part of the cover 52. A cavity is formed within the cover 52, and this cavity connects to the inner space of the fluid holder 63. When the fluid 74 is introduced into the fluid holder 63 through the entry/exit port 51, the fluid 74 reaches the bottom of the inner space of the cover 52. The fluid 74 is therefore held both within the fluid holder 63 and within the cover 52.

The fan 53 blows air onto the fluid 74 within the cover 52 to produce a force in the fluid 74 that causes the fluid 74 to move up and down. This force is transmitted to the fluid 74 held within the fluid holder 63 and produces ripples in the fluid 74 within the fluid holder 63.

Figure 6:
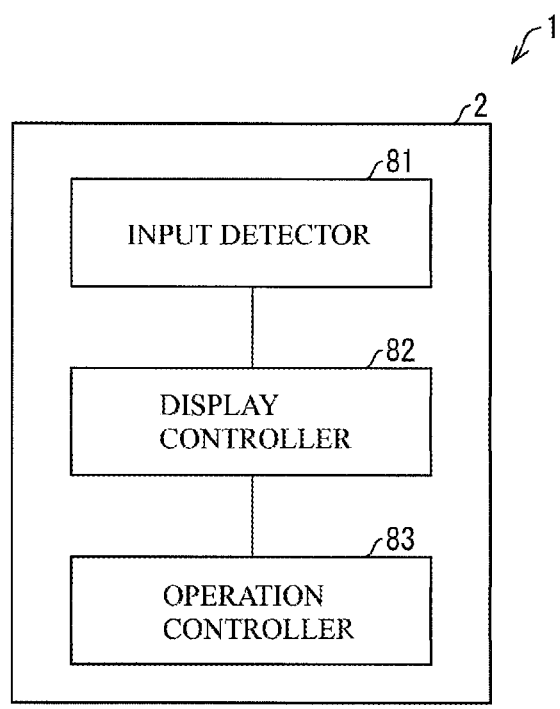
FIG. 6 is a diagram illustrating a functional configuration of a game machine.

FIG. 6 is a diagram illustrating a functional configuration of the game machine 1. As illustrated in FIG. 6, the game machine 1 includes an input detector 81, a display controller 82, and an operation controller 83. The input detector 81 detects a pressing operation made by the player on the touch panel 61. The display controller 82 causes an image to be displayed in the display panel 64. The display controller 82 is a liquid-crystal driver, for example. The operation controller 83 controls the operation of the fan 53.

Ripple Effect

Figure 7:
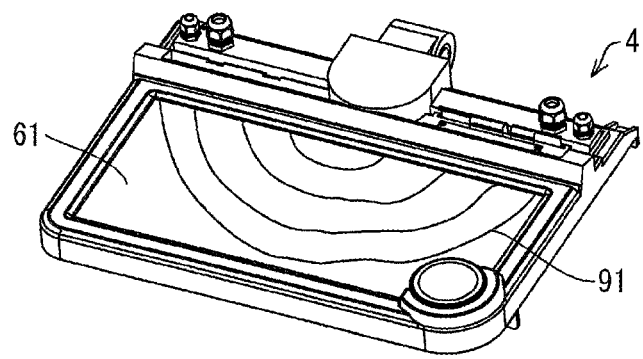
FIG. 7 is a diagram illustrating a ripple effect produced in the operating apparatus.

FIG. 7 is a diagram illustrating a ripple effect produced in the operating apparatus 4. The operation controller 83 produces ripples 91 in the fluid 74 by operating the fan 53 while an image is being displayed in the display panel 64. Because the touch panel 61 and the glass plate 62 are transparent, the player can clearly see the ripples 91 produced in the fluid holder 63. Additionally, because the touch panel 61, the glass plate 62, and the fluid holder 63 are transparent, the player can clearly see the image displayed in the display panel 64. The operating apparatus 4 can simultaneously present the image displayed in the display panel 64 and the ripples 91 produced in the fluid 74 in the fluid holder 63 to the player, and thus the player's attention can be strongly captured.

Variation

The game machine 1 may further have the light emission control function for the LEDs 21 described in the first embodiment. According to this configuration, the operating apparatus 4 further includes the LED board 12 according to the first embodiment. The LED board 12 is arranged between the fluid holder 63 and the display panel 64. The operating apparatus 4 further includes the light emission controller 32 according to the first embodiment.

As in the first embodiment, the game machine 1 can more strongly catch the player's attention by illuminating the periphery of the button 41 corresponding to a pressing operation made by the player on the touch panel 61, on the basis of that pressing operation. By furthermore combining the image display, the ripple production, and the light emission control of the LEDs 21, the game machine 1 can present, to the player, an effect that more strongly captures the player's attention.

Instead of the fan 53, the operating apparatus 4 may include a different mechanism for producing ripples in the fluid 74. This different mechanism may be a mechanism that, for example, moves an object disposed at the surface of the fluid 74 up and down relative to the surface of the fluid 74. Alternatively, a plate submerged in the fluid 74 may be moved back and forth in the direction in which the ripples 91 are to advance. Or, a weight suspended above the surface of the fluid 74 may be dropped at once to the surface of the fluid 74.

Third Embodiment

A third embodiment of the present invention will be described next with reference to FIGS. 8 to 12. Elements that are the same as in the first or second embodiment will be given the same reference numerals, and detailed descriptions thereof will be omitted.

Like the game machine 1 according to the first embodiment, the game machine 1 according to the third embodiment includes the housing 2 and the operating apparatus 4. The external appearance of the game machine 1 is the same as that illustrated in FIG. 1, and thus detailed descriptions thereof will be omitted as well.

Details of Operating Apparatus 4

Figure 8A:
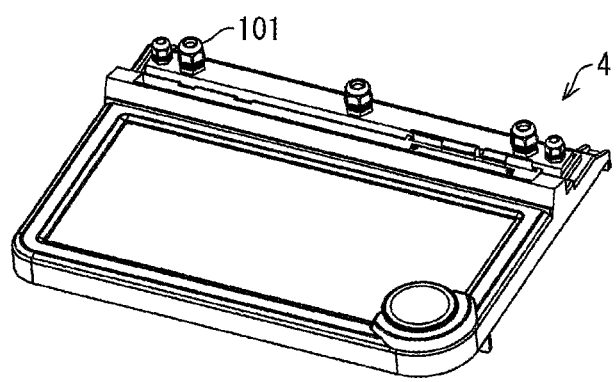
FIGS. 8A to 8C are diagrams illustrating an operating apparatus according to a third embodiment of the present invention in detail.
Figure 8B:
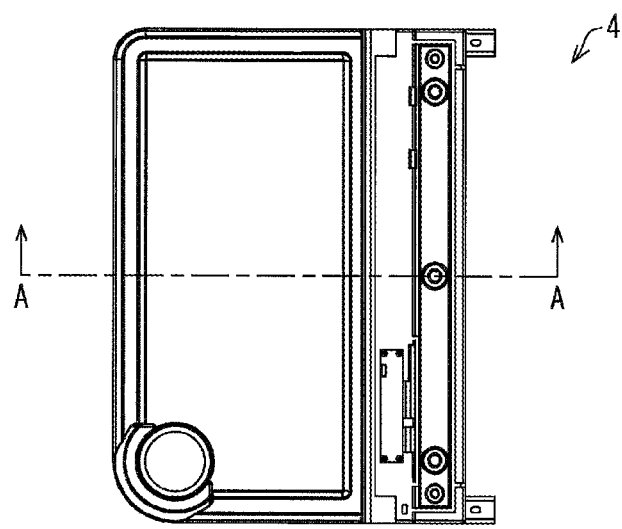
Figure 8C:
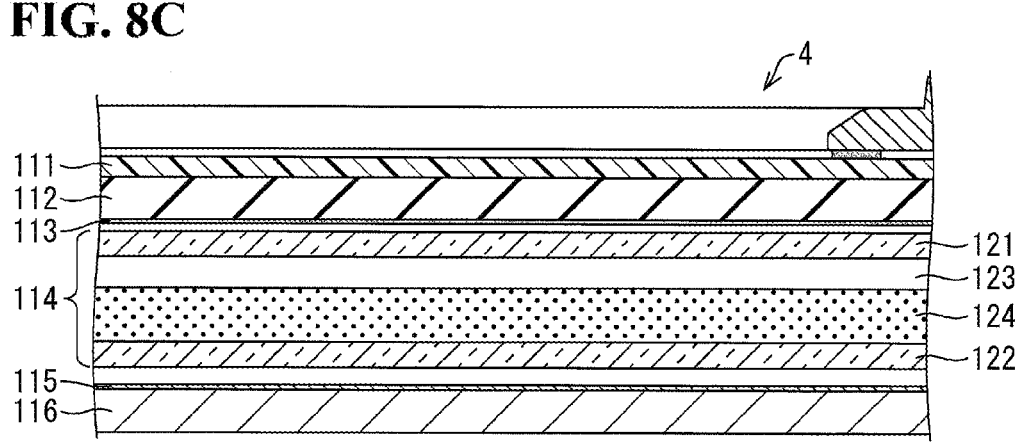

FIGS. 8A to 8C are diagrams illustrating the operating apparatus 4 according to the third embodiment of the present invention in detail. FIG. 8A illustrates the operating apparatus 4 from an angle. FIG. 8B illustrates the operating apparatus 4 from above. FIG. 8C illustrates the operating apparatus 4 from an A-A cross-section indicated in FIG. 8B.

As illustrated in FIG. 8A, the operating apparatus 4 includes an entry/exit port 101. The entry/exit port 101 is the same as the entry/exit port 51 according to the second embodiment, and thus detailed descriptions thereof will be omitted.

As illustrated in FIG. 8C, the operating apparatus 4 includes a touch panel 111, a glass plate 112, a first projecting portion 113 (a first display unit), a fluid holder 114, a second projecting portion 115 (a second display unit), and an acrylic plate 116. The touch panel 111, the glass plate 112, the first projecting portion 113, the fluid holder 114, the second projecting portion 115, and the acrylic plate 116 are stacked in that order from the top. The glass plate 112 is arranged below the touch panel 111, the first projecting portion 113 is arranged below the glass plate 112, the fluid holder 114 is arranged below the first projecting portion 113, the second projecting portion 115 is arranged below the fluid holder 114, and the acrylic plate 116 is arranged below the second projecting portion 115.

The touch panel 111 is the same as the touch panel 11 according to the first embodiment, and thus detailed descriptions thereof will be omitted.

The glass plate 112 is the same as the glass plate 62 according to the second embodiment, and thus detailed descriptions thereof will be omitted.

The first projecting portion 113 is a film that can switch between a transparent state and a projecting state. The first projecting portion 113 is a functional liquid-crystal film, for example. "Projecting state" refers to a state in which an image can be projected onto the first projecting portion 113. The projecting state is a state in which the first projecting portion 113 is whitish as a whole, for example. The projecting state can also be called a state in which the first projecting portion 113 functions as a screen. When the first projecting portion 113 controlled to the projecting state is irradiated with light corresponding to an image, the image is projected onto the first projecting portion 113. The state of the first projecting portion 113 is controlled in accordance with whether or not power is supplied to the first projecting portion 113. The first projecting portion 113 is controlled to the projecting state in the case where power is not supplied to the first projecting portion 113, and is controlled to the transparent state in the case where power is supplied to the first projecting portion 113.

The fluid holder 114 is a plate-shaped member inside of which a transparent fluid is held. The fluid holder 114 is constituted of a first transparent plate 121 and a second transparent plate 122 arranged opposing each other. The first transparent plate 121 and the second transparent plate 122 are the same as the first transparent plate 71 and the second transparent plate 72 according to the second embodiment, and thus detailed descriptions thereof will be omitted.

The fluid holder 114 holds air 123 and a fluid 124 within the space formed therein. The air 123 and the fluid 124 are the same as the air 73 and the fluid 74 according to the second embodiment, and thus detailed descriptions thereof will be omitted.

The second projecting portion 115 is a film that can switch between a transparent state and a projecting state. The second projecting portion 115 is a functional liquid-crystal film, for example. "Projecting state" refers to a state in which an image can be projected onto the second projecting portion 115. The projecting state is a state in which the second projecting portion 115 is whitish as a whole, for example. The projecting state can also be called a state in which the second projecting portion 115 functions as a screen. When the second projecting portion 115 controlled to the projecting state is irradiated with light corresponding to an image, the image is projected onto the second projecting portion 115. The state of the second projecting portion 115 is controlled in accordance with whether or not power is supplied to the second projecting portion 115. The second projecting portion 115 is controlled to the projecting state in the case where power is not supplied to the second projecting portion 115, and is controlled to the transparent state in the case where power is supplied to the second projecting portion 115.

The acrylic plate 116 is the same as the acrylic plate 65 according to the second embodiment, and thus detailed descriptions thereof will be omitted.

Figure 9A:
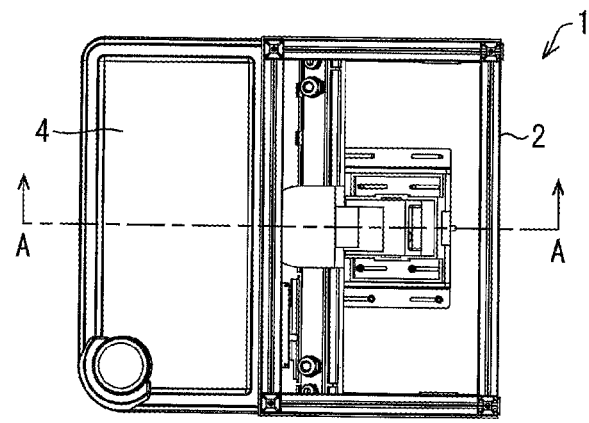
FIGS. 9A and 9B are diagrams illustrating part of the internal structure of a game machine.
Figure 9B:
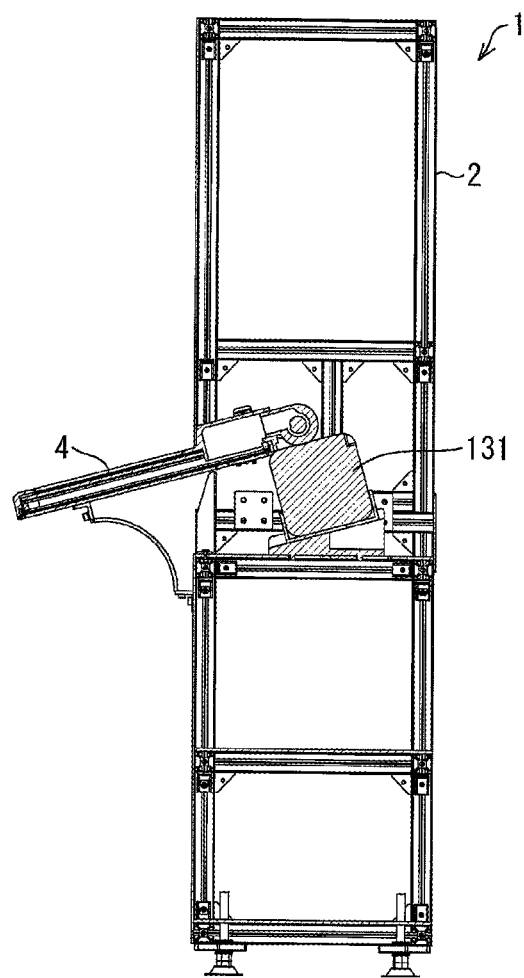

FIGS. 9A and 9B are diagrams illustrating part of the internal structure of the game machine 1. FIG. 9A illustrates the game machine 1 from above. FIG. 9B illustrates the game machine 1 from an A-A cross-section indicated in FIG. 9A.

As illustrated in FIG. 9B, the game machine 1 includes a projector 131 arranged within the housing 2. The projector 131 emits light corresponding to an image toward the operating apparatus 4 from a rear surface of the operating apparatus 4. As a result, an image is projected onto the first projecting portion 113 or the second projecting portion 115.

Figure 10:
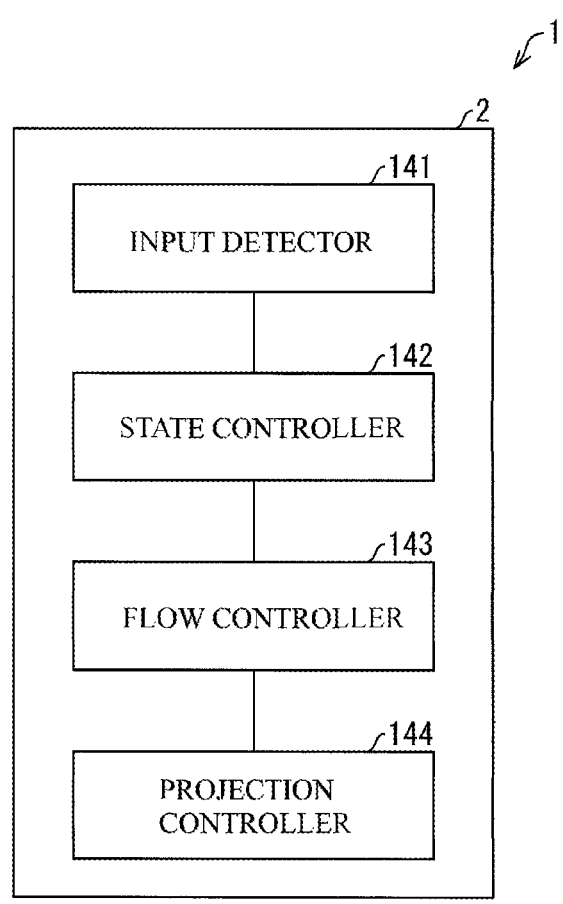
FIG. 10 is a diagram illustrating the functional configuration of a game machine according to the third embodiment of the present invention.

FIG. 10 is a diagram illustrating the functional configuration of the game machine 1 according to the third embodiment of the present invention. As illustrated in FIG. 10, the game machine 1 includes an input detector 141, a state controller 142, a flow controller 143, and a projection controller 144. The input detector 141 detects a pressing operation made by the player on the touch panel 111. The state controller 142 controls the states of the first projecting portion 113 and the second projecting portion 115. The flow controller 143 controls the flow of the fluid 124 in the fluid holder 114. The projection controller 144 controls the operation of the projector 131.

Examples of Image Display

Figure 11A:
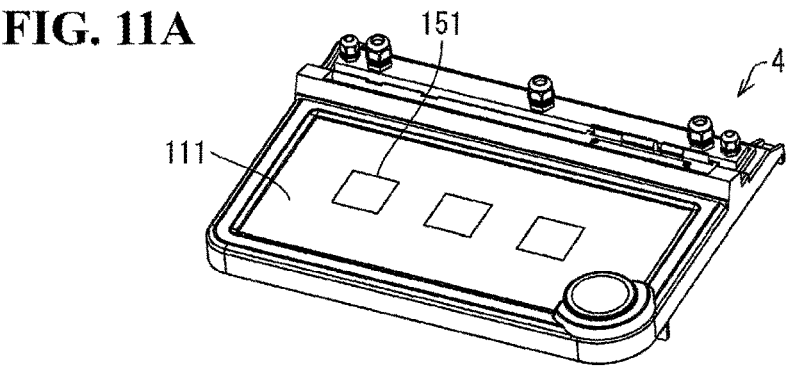
FIGS. 11A and 11B are diagrams illustrating examples of an image display in the operating apparatus.
Figure 11B:
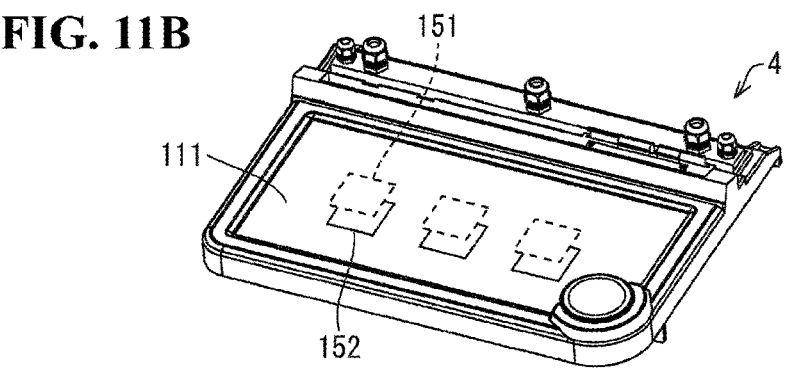

FIGS. 11A and 11B are diagrams illustrating examples of an image display in the operating apparatus 4. FIG. 11A illustrates the operating apparatus 4, where an image is displayed in the first projecting portion 113. FIG. 11B illustrates the operating apparatus 4, where an image is displayed in the second projecting portion 115.

In FIG. 11A, the state controller 142 does not supply power to the first projecting portion 113, but does supply power to the second projecting portion 115. As a result, the state controller 142 controls the first projecting portion 113 to the projecting state and controls the second projecting portion 115 to the transparent state. The projection controller 144 controls the projector 131 to emit light corresponding to an image including a plurality of buttons 151 (called "image light" hereinafter) from the projector 131 toward the rear surface of the operating apparatus 4. The image light passes through the transparent acrylic plate 116 and reaches the second projecting portion 115. The second projecting portion 115 is in the transparent state, and thus the image light passes through the second projecting portion 115. The image light passes through the transparent fluid holder 114 and reaches the first projecting portion 113. The first projecting portion 113 is in the projecting state, and thus when the image light reaches the first projecting portion 113, the image is projected onto the first projecting portion 113, and thus the image is displayed in the first projecting portion 113.

In FIG. 11B, the state controller 142 supplies power to the first projecting portion 113 but does not supply power to the second projecting portion 115. As a result, the state controller 142 controls the first projecting portion 113 to the transparent state and controls the second projecting portion 115 to the projecting state. The projection controller 144 controls the projector 131 to emit light corresponding to an image including a plurality of buttons 152 (called "image light" hereinafter) from the projector 131. The image light passes through the transparent acrylic plate 116 and reaches the second projecting portion 115. The second projecting portion 115 is in the projecting state, and thus when the image light reaches the second projecting portion 115, the image is projected onto the second projecting portion 115, and thus the image is displayed in the second projecting portion 115. The first projecting portion 113 is in the transparent state, and thus the elements arranged above the second projecting portion 115 are all transparent. Accordingly, the image projected onto the second projecting portion 115 reaches the player's eyes without interference from the first projecting portion 113 and the like.

As described above, the projector 131 projects an image including the plurality of buttons 151 onto the first projecting portion 113 while the first projecting portion 113 is controlled to the projecting state and the second projecting portion 115 is controlled to the transparent state. The image is displayed in the first projecting portion 113 as a result. The player can clearly see the image including the plurality of buttons 151 projected onto the first projecting portion 113.

The projector 131 projects an image including the plurality of buttons 152 onto the second projecting portion 115 while the first projecting portion 113 is controlled to the transparent state and the second projecting portion 115 is controlled to the projecting state. The image is displayed in the second projecting portion 115 as a result. The player can clearly see the image including the plurality of buttons 152 projected onto the second projecting portion 115.

The first projecting portion 113 is arranged further forward in the operating apparatus 4 (that is, closer to the touch panel 111) than the second projecting portion 115. Accordingly, the image including the plurality of buttons 151 projected onto the first projecting portion 113 is displayed on a forward side of the operating apparatus 4. On the other hand, the image including the plurality of buttons 152 projected onto the second projecting portion 115 is displayed on a rearward side of the operating apparatus 4. By controlling the states of the first projecting portion 113 and the second projecting portion 115 as appropriate in this manner, the operating apparatus 4 can move the display position of the image toward the player or away from the player. More diverse effects can therefore be presented to the player through the image display.

Examples of Flow Effect

Figure 12A:
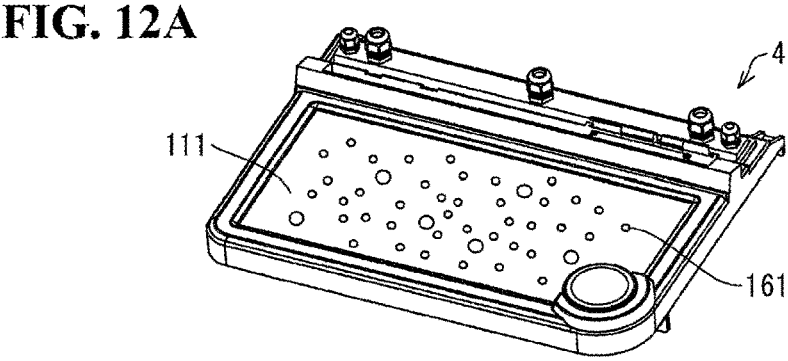
FIGS. 12A and 12B are diagrams illustrating examples of fluid flow effects in the operating apparatus.
Figure 12B:
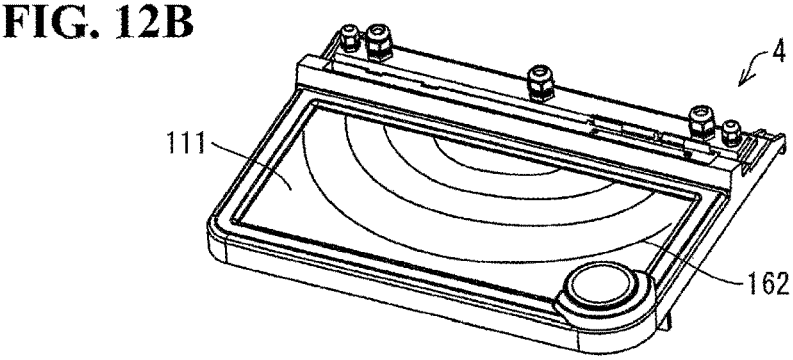

FIGS. 12A and 12B are diagrams illustrating examples of flow effects of the fluid 124 in the operating apparatus 4. FIG. 12A illustrates the operating apparatus 4 in which bubbles 161 have been produced in the fluid 124. FIG. 12B illustrates the operating apparatus 4 in which ripples 162 have been produced in the fluid 124.

In FIG. 12A, the flow controller 143 produces the bubbles 161 in the fluid 124 by controlling the flow of the fluid 124. To accomplish this, the game machine 1 further includes a bubble generator (not illustrated). The bubble generator is constituted of a typical air stone and air pump that may be provided in an aquarium, for example. The air stone is submerged in the fluid 124 within the fluid holder 114. The air stone may be arranged in a position in which the air stone does not interfere with the viewing of the image displayed in the first projecting portion 113 or the second projecting portion 115. The air pump is arranged within the housing 2, for example. An air supply tube is connected to the air pump, and this tube is inserted into the fluid holder 114 through the entry/exit port 101 and is connected to the air stone.

The flow controller 143 controls the air pump to supply air to the air stone through the tube from the air pump. The supplied air is dispersed into the fluid 124 from the air stone, producing the bubbles 161 in the fluid 124 as a result. The player can see the bubbles 161 that have been produced.

In FIG. 12B, the flow controller 143 produces the ripples 162 in the fluid 124 by controlling the flow of the fluid 124. To achieve this, the operating apparatus 4 may include the cover 52 and the fan 53 according to the second embodiment. The flow controller 143 can produce the ripples 162 in the fluid 124 by controlling the fan 53. The mechanism for producing the ripples 162 is the same as in the second embodiment, and thus detailed descriptions thereof will be omitted.

The game machine 1 displays an image in either the first projecting portion 113 or the second projecting portion 115. Furthermore, flow is produced in the fluid 124 while the image is being displayed in either the first projecting portion 113 or the second projecting portion 115. In other words, the game machine 1 simultaneously presents the image displayed in the first projecting portion 113 or the second projecting portion 115 and the flow effect (the bubbles 161 or the ripples 162) produced in the fluid 124 within the fluid holder 114 to the player. The game machine 1 can therefore more strongly capture the player's attention.

In the case where the fluid 124 is a liquid such as water, the game machine 1 can make the flow produced in the fluid 124 more clearly visible to the player. The game machine 1 can more effectively capture the player's attention by producing the bubbles 161 or the ripples 162 in the fluid 124.

Variation

The game machine 1 may further have the light emission control function for the LEDs 21 described in the first embodiment. According to this configuration, the operating apparatus 4 further includes the LED board 12 according to the first embodiment. The LED board 12 is arranged between the fluid holder 114 and the second projecting portion 115. The operating apparatus 4 further includes the light emission controller 32 according to the first embodiment.

As in the first embodiment, the game machine 1 can more strongly catch the player's attention by illuminating the periphery of the buttons 151 or the buttons 152 corresponding to a pressing operation made by the player on the touch panel 111, on the basis of that pressing operation. By furthermore combining the effects of the image display, the flow production, and the light emission control of the LEDs 21 and presenting those effects to the player, the game machine 1 can even more strongly capture the player's attention.

The flow controller 143 can control the flow in the fluid 124 even when both the first projecting portion 113 and the second projecting portion 115 are controlled to the transparent state. In this case, the flow in the fluid 124 is controlled while the entire operating apparatus 4 is in the transparent state, and thus an effect providing a sense of transparency is presented to the player. Such an effect makes a different impression on the player than an effect combining the image display and the flow control, and can thus more strongly capture the player's attention. In the case where the operating apparatus 4 further has a function for controlling the light emission of the LEDs 21, the operating apparatus 4 can present an effect combining the flow control of the fluid 124 with the light emission control of the LEDs 21 to the player while both the first projecting portion 113 and the second projecting portion 115 are controlled to the transparent state. Such an effect achieves both a sense of transparency and of brilliance, and thus can even more strongly capture the player's attention.

The first projecting portion 113 may be a first display panel similar to the display panel 13 according to the first embodiment. The first display panel is a liquid-crystal display panel, for example. The second projecting portion 115 may be a second display panel similar to the display panel 13 according to the first embodiment. The second display panel is a liquid-crystal display panel, for example. In this case, the game machine 1 need not include the projector 131. Instead, the game machine 1 includes a first display controller that causes an image to be displayed in the first display panel and a second display controller that causes an image to be displayed in the second display panel. The first display controller and the second display controller are liquid-crystal drivers, for example.

According to this configuration, the first display panel is controlled to a transparent state when not displaying an image. The first display unit includes a transparent backlight, for example. The first display controller does not cause an image to be displayed in the first display panel while the second display controller is causing an image to be displayed in the second display panel. As a result, the first display panel is controlled to the transparent state, and thus the image displayed in the second display panel reaches the player's eyes without interference from the first display panel. The player can therefore see the image displayed in the second display panel.

The present invention is not intended to be limited to the above-described embodiments, and many changes can be made within the scope laid out in the claims. Embodiments achieved by combining the technical means disclosed in different embodiments as appropriate also fall within the technical scope of the present invention. New technical features can also be realized by combining the technical means disclosed in the respective embodiments.

The invention claimed is:

1. An operating apparatus included in a game machine, the apparatus comprising:
    a touch panel;
    a light-emitting element board arranged below the touch panel, a plurality of light-emitting elements being mounted on the light-emitting element board and emitting visible light; and
    a display arranged below the light-emitting element board, the display changing an image including a plurality of display items displayed in the display such that at least one of the plurality of light-emitting elements are provided at a periphery of each of the plurality of display items.

2. The operating apparatus according to claim 1, wherein the plurality of light-emitting elements comprise a plurality of light-emitting diodes.

3. A game machine comprising:
    the operating apparatus according to claim 2;
    a display controller coupled to the display and configured to cause the image including the plurality of display items to be displayed in the display;
    an input detector configured to detect a pressing operation at an input position in the touch panel corresponding to any one of the plurality of display items; and
    a light emission controller configured to cause the at least one of the plurality of light-emitting elements corresponding to the one of the plurality of display items to emit light.

4. A game machine comprising:
    the operating apparatus according to claim 1;
    a display controller coupled to the display and configured to cause the image including the plurality of display items to be displayed in the display;
    an input detector configured to detect a pressing operation at an input position in the touch panel corresponding to any one of the plurality of display items; and
    a light emission controller configured to cause the at least one of the plurality of light-emitting elements corresponding to the one of the plurality of display items to emit light.

5. The operating apparatus according to claim 1, wherein the touch panel is transparent.

6. The operating apparatus according to claim 1, wherein the light-emitting element board is transparent.

7. The operating apparatus according to claim 1, wherein the display is transparent when the image is not displayed.

8. The operating apparatus according to claim 1, further comprising
    a fluid holder provided below the touch panel and above the light-emitting element board, the fluid holder holding a transparent fluid.

9. A method of controlling a game machine including an operating apparatus comprising: a touch panel; a light-emitting element board provided below the touch panel and having a plurality of light-emitting elements mounted thereon; and a display provided below the light-emitting element board, the method comprising:
    causing an image including a plurality of display items to be displayed in the display such that at least one of the plurality of light-emitting elements are provided at a periphery of each of the plurality of display items;
    detecting a pressing operation at an input position in the touch panel corresponding to any one of the plurality of display items; and
    causing the at least one of the plurality of light-emitting elements corresponding to the one of the plurality of display items to emit light.

10. The method according to claim 9, wherein
the plurality of light-emitting elements comprises a plurality of light-emitting-diodes.

11. A method of controlling a game machine including an operating apparatus including: a touch panel; a light-emitting element board provided below the touch panel and having a plurality of light-emitting elements mounted thereon; a display provided below the light-emitting element board;

and an input detector detecting a pressing operation at an input position in the touch panel, the method comprising:

causing an image including a plurality of display items to be displayed in the display such that at least one of the plurality of light-emitting elements are provided at a periphery of each of the plurality of display items;

detecting a pressing operation at an input position in the touch panel corresponding to any one of the plurality of display items; and causing the at least one of the plurality of light-emitting elements corresponding to the one of the plurality of display items to emit light.

12. The method according to claim 11, wherein
the plurality of light-emitting elements comprises a plurality of light-emitting-diodes.

* * * * *